(12) United States Patent
Magarida et al.

(10) Patent No.: US 9,657,787 B2
(45) Date of Patent: May 23, 2017

(54) SELECTABLE ONE-WAY CLUTCH (71) Applicant: TOYOTA JIDOSHA KABUSHIKI KAISHA, Toyota-shi, Aichi-ken (JP)

(72) Inventors: Naofumi Magarida, Shizuoka-ken (JP); Kenji Itagaki, Shizuoka-ken (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 15/063,851

(22) Filed: Mar. 8, 2016

(65) Prior Publication Data

US 2016/0265604 A1 Sep. 15, 2016

(30) Foreign Application Priority Data

Mar. 9, 2015 (JP) .................................. 2015-045911

(51) Int. Cl.
*F16D 41/12* (2006.01)
*F16D 41/14* (2006.01)

(52) U.S. Cl.
CPC ............ *F16D 41/125* (2013.01); *F16D 41/14* (2013.01)

(58) Field of Classification Search
CPC .................................................. F16D 41/125
See application file for complete search history.

(56) References Cited

U.S. PATENT DOCUMENTS

2011/0183806 A1\* 7/2011 Wittkopp ................ F16D 7/028
475/263
2012/0115663 A1 5/2012 Wilton et al.

FOREIGN PATENT DOCUMENTS

JP 2002-514292 A 5/2002
WO 98/49456 A1 11/1998

\* cited by examiner

*Primary Examiner* — Mark Manley
(74) *Attorney, Agent, or Firm* — Andrews Kurth Kenyon LLP (57) ABSTRACT

A selectable one-way clutch includes a first plate, a second plate, a claw, a selector plate and an outer shell. The second plate is placed on the same axis as the first plate. The second plate has a recessed portion. The claw is provided in the first plate and meshes with the recessed portion in a state where the claw projects from the first plate only when the second plate rotates in a predetermined direction. The selector plate is placed between the first plate and the second plate. The selector plate changes a state of claw. The outer shell covers an outer periphery of the first plate. The outer periphery of the first plate and an inner periphery of the outer shell have a tapered shape in which a diameter is gradually reduced toward a direction distance from the second plate.

1 Claim, 7 Drawing Sheets

SELECTABLE ONE-WAY CLUTCH

INCORPORATION BY REFERENCE

The disclosure of Japanese Patent Application No. 2015-045911 filed on Mar. 9, 2015 including the specification, drawings and abstract is incorporated herein by reference in its entirety.

BACKGROUND

1. Technical Field

The disclosure relates to a selectable one-way clutch.

2. Description of Related Art

Japanese Patent Application Publication No. 2002-514292 (JP 2002-514292 A) describes a selectable one-way clutch. In the selectable one-way clutch of JP 2002-514292 A, a plate including a claw provided in a projectable manner and a plate including a recessed portion with which the claw meshes are provided on the same axis. By changing a state of the claw by a selector plate provided between two plates, a lock mode in which torque transmission between the two plates is allowed only at the time of a rotation in one predetermined direction, or a release mode in which torque transmission between the two plates is blocked only at the time of a rotation in both directions is selectable.

SUMMARY

Because of a structure of the selectable one-way clutch of JP 2002-514292 A, when the claw meshes with the recessed portion and the two plates are joined to each other, axial centers of the two plates are displaced from each other just by a tolerance in manufacturing design. This may consequently affect durability and a silence property of components.

The disclosure provides a selectable one-way clutch that can reduce displacement between axial centers at the time of joining two plates.

An example aspect of the disclosure provides a selectable one-way clutch includes a first plate, a second plate, a claw, a selector plate and an outer shell. The second plate is placed on the same axis as the first plate, the second plate having a recessed portion. The claw is provided in the first plate. The claw is configured to project from the first plate toward the second plate. The claw is configured to mesh with the recessed portion of the second plate in a state where the claw projects from the first plate only at the time when the second plate rotates in a predetermined rotation direction. The selector plate is placed between the first plate and the second plate. The selector plate is configured to change a state of the claw between a state where the claw is projectable from the first plate and a state where the claw is maintained to be accommodated on a first-plate side. The outer shell is configured to cover an outer periphery of the first plate. The first plate is mounted on a holding member such that the first plate is non-rotatable around the axis and moves in a direction of the axis. The outer shell is configured to be immovable relative to the holding member in a state where the outer shell is positioned in a radial direction on the basis of the axis. The outer periphery of the first plate is covered with the outer shell and an inner periphery of the outer shell that covers the outer periphery of the first plate having a tapered shape in which a diameter is gradually reduced toward a direction distanced from the second plate.

According to the above configuration, when the claw provided in the first plate meshes with the recessed portion formed in the second plate so that the first plate is joined to the second plate, a force to distance the first plate and the second plate from each other with their axial centers being displaced is applied thereto. The inner periphery of the outer shell positioned in the radial direction on the basis of the axis and immovable relative to the holding member on which the first plate is mounted and the outer periphery of the first plate covered with the outer shell are formed in a tapered shape in which a diameter is gradually reduced toward a direction distanced from the second plate. On this account, in a course where the first plate moves in a direction distanced from the second plate, the inner periphery of the outer shell makes contact with an outer periphery of the first plate, so that an alignment function to reduce the displacement of the axial center of the first plate by the outer shell works. Since such an alignment function works in the selectable one-way clutch, a tolerance at the time of manufacturing design of each part such as the first plate can be increased so as to enlarge an allowable range of the displacement of the axial center. Hereby, when the first plate is joined to the second plate, a conversion amount at the time when part of an impact energy caused due to meshing of the claw with the recessed portion of the second plate is converted into a kinetic energy can be increased. This can contribute to relaxing of an impact force at the time of the meshing of the claw.

The selectable one-way clutch may further include a biasing member. The biasing member may be provided between the first plate and the outer shell. The biasing member may be configured to bias the first plate and the outer shell in directions where the first plate and the outer shell are distanced from each other. According to the above aspect, when the first plate is released from the second plate, the first plate can be easily returned to an initial position distanced from the outer shell by the biasing member. Further, at the time when the first plate is joined to the second plate, the first plate moves in a direction distanced from the second plate so as to make contact with the outer shell. At this time, an impact caused due to the contact can be relaxed by the biasing member.

According to the selectable one-way clutch, the inner periphery of the outer shell positioned in the radial direction on the basis of the axis and immovable relative to the holding member on which the first plate is mounted and the outer periphery of the first plate covered with the outer shell are formed in a tapered shape in which a diameter is gradually reduced toward a direction distanced from the second plate. On this account, in a course where the first plate moves in a direction distanced from the second plate, the inner periphery of the outer shell makes contact with the outer periphery of the first plate, so that the displacement of the axial center of the first plate can be reduced.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

First Embodiment

Figure 1:
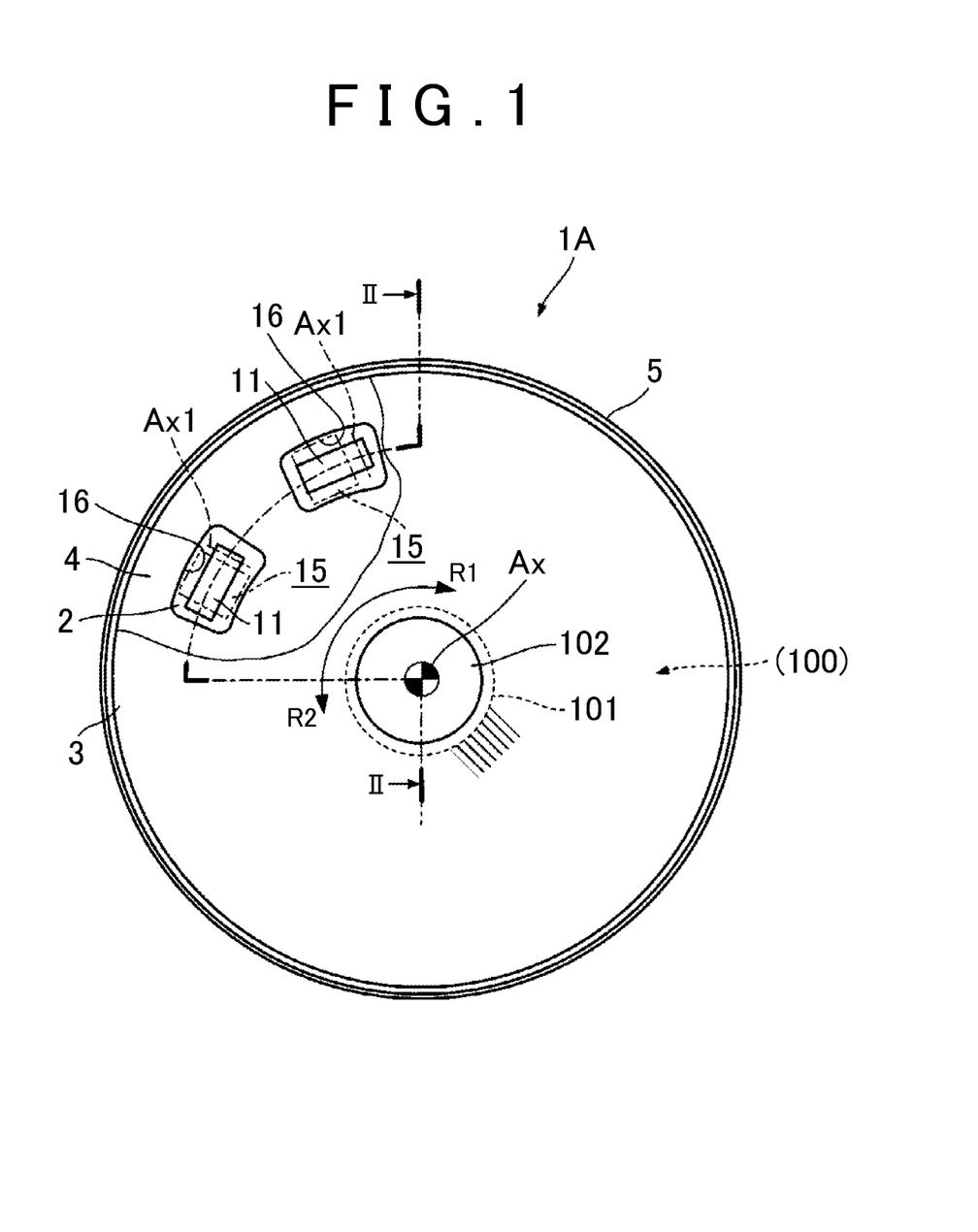
FIG. 1 is a view illustrating a selectable one-way clutch according to a first embodiment.
Figure 2:
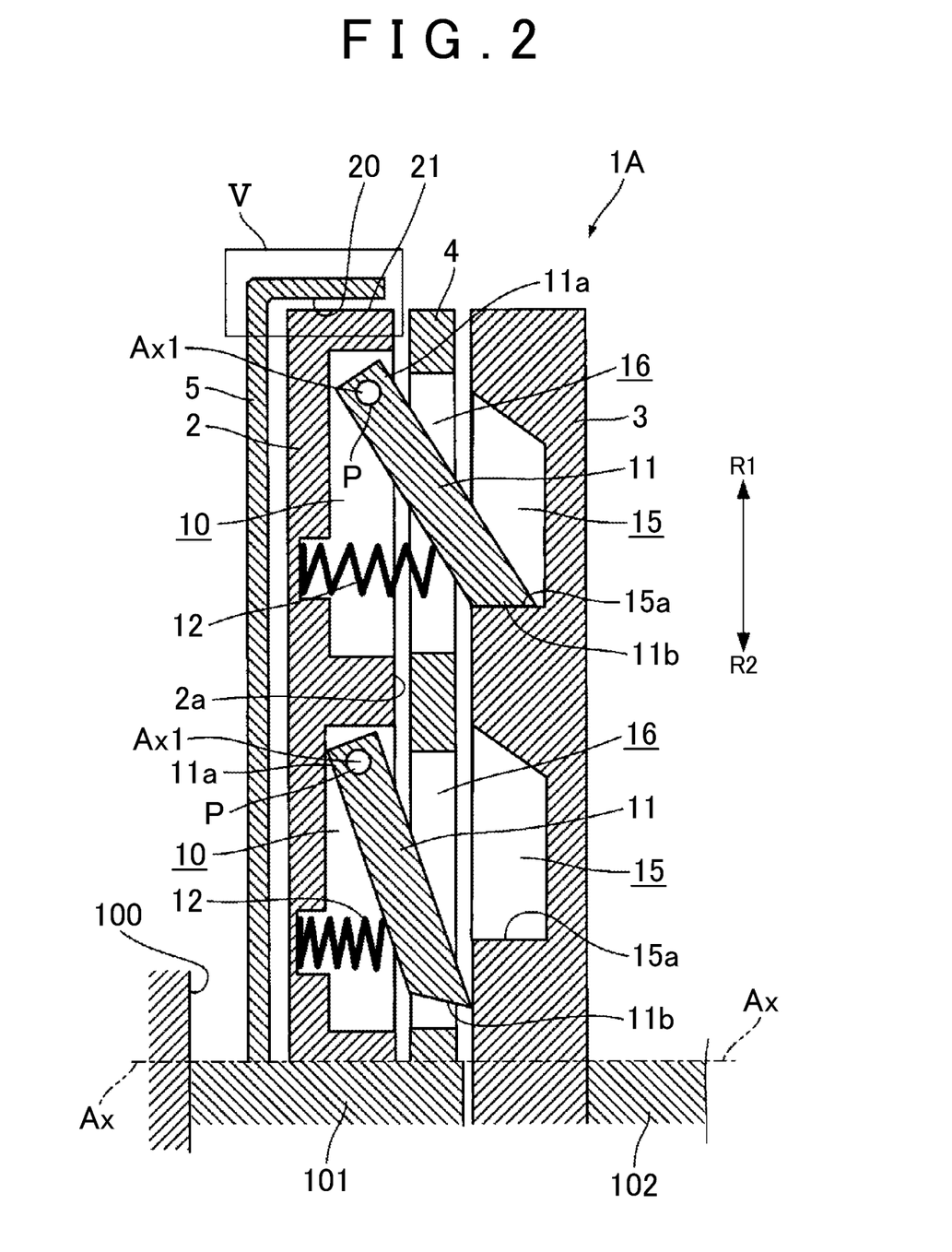
FIG. 2 is a sectional view at the time of a lock mode, taken along a line II-II in FIG. 1.
Figure 3:
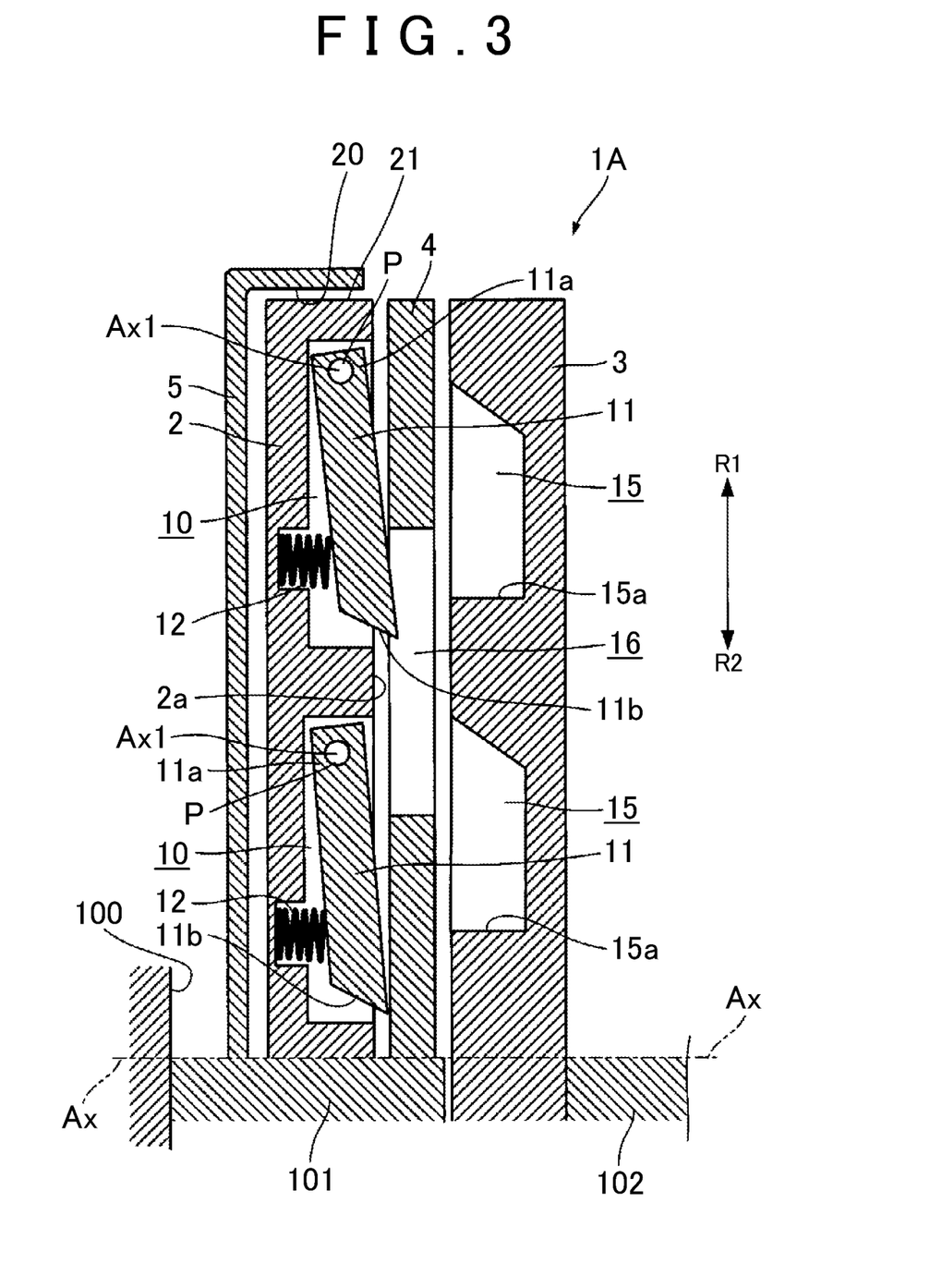
FIG. 3 is a sectional view at the time of a release mode, taken along the line II-II in FIG. 1.

A selectable one-way clutch (hereinafter referred to as a clutch) 1A illustrated in FIGS. 1 to 3 is used by being incorporated into a hybrid transformer axle (not shown). The clutch 1A is provided between a fixed shaft 101 fixed to a case 100 and a rotating shaft 102 rotatable around the same axis Ax as the fixed shaft 101. The clutch 1A can select an operation mode between a lock mode and a release mode. The lock mode is a mode in which a state where torque transmission from the rotating shaft 102 to the fixed shaft 101 is allowed so as to fix the rotating shaft 102 in a case where a rotation direction of the rotating shaft 102 is R1 and a state where the transmission torque is blocked so as to release the rotating shaft 102 in a case where the rotation direction is R2 are switched. The release mode is a mode in which torque transmission from the rotating shaft 102 to the fixed shaft 101 is blocked in either case where the rotation direction of the rotating shaft 102 is R1 or R2, so as to maintain the rotating shaft 102 is released.

The clutch 1A includes: a holding plate 2 splined to the fixed shaft 101 in a state where the holding plate 2 is non-rotatable around the axis Ax but movable in an axis-Ax direction; a rotating plate 3 provided integrally rotatably around the axis Ax with the rotating shaft 102; a selector plate 4 placed between the holding plate 2 and the rotating plate 3 and provided rotatably around the axis Ax; and an outer shell 5 that covers an outer periphery of the holding plate 2. The outer shell 5 is fixed to the fixed shaft 101 in a state where the outer shell 5 is positioned in a radial direction based on the axis Ax, so the outer shell 5 is immovable relative to the fixed shaft 101 and the case 100. The holding plate 2 is one example of a first plate. The rotating plate 3 is one example of a second plate. The fixed shaft 101 on which the holding plate 2 is mounted is one example of a holding member.

In the holding plate 2, a plurality of holding chambers 10 is formed such that the plurality of holding chambers 10 is opened on a side opposed to the rotating plate 3 and arranged in a circumferential direction. Each of the holding chambers 10 is provided with one claw 11 meshing with the rotating plate 3. A base end 11a of each claw 11 is attached to the holding plate 2 via a spindle P rotatably around an axis Ax1 extending in a radial direction of the holding plate 2, and is biased by a spring 12 in a projection direction toward a rotating-plate-3 side. Hereby, each claw 11 can be operated in a state where the each claw 11 is moved backward toward a holding-plate-2 side and accommodated in the holding chamber 10 or in a state where the each claw 11 projects from the holding plate 2 toward the rotating plate 3. That is, each claw 11 is provided in the holding plate 2 in a projectable state.

In the rotating plate 3, a plurality of recessed portions 15 is formed such that the plurality of recessed portions 15 is opened on a side opposed to the holding plate 2 and arranged in a circumferential direction. Each of the recessed portions 15 includes a wall portion 15a with which a tip end 11b of the claw 11 abuts at the time when the projecting claw 11 meshes therewith. Although not illustrated herein, the number of recessed portions 15 is larger than the number of claws 11, and phases of the recessed portion 15 and phases of the claws 11 are shifted from each other (see FIG. 2). Accordingly, some of the plurality of projecting claws 11 mesh with some of the plurality of recessed portions 15.

In the selector plate 4, a plurality of through holes 16 which is arranged in the circumferential direction and through which the claws 11 projecting can be partially passed is formed with the same phases as the claws 11. A rotation position of the selector plate 4 can be switched between a locked position in FIG. 2 at which the claw 11 passes through the through hole 16 so that the claw 11 can mesh with the recessed portion 15 of the rotating plate 3, and a released position in FIG. 3 at which the tip end 11b of the claw 11 abuts with the selector plate 4 so as to limit projection of the claw 11 and maintain the claw 11 to be accommodated on the holding-plate-2 side. Hereby, the lock mode and the release mode are performed selectively. The switching of the rotation position of the selector plate 4 is performed by an actuator (not shown).

As is apparent from FIG. 2, at the time when a rotation direction of the rotating plate 3 is R1, the tip end 11b of the claw 11 abuts with the wall portion 15a of the recessed portion 15. Accordingly, the claw 11 meshes with the recessed portion 15 of the rotating plate 3, so that the holding plate 2 is joined to the rotating plate 3, thereby allowing torque transmission therebetween and fixing the rotating shaft 102. In the meantime, at the time when the rotation direction of the rotating plate 3 is R2, since the claw 11 is inclined toward a direction of R2, even if the claw 11 interferes with the recessed portion 15 of the rotating plate 3, the claw 11 is just pushed back toward the holding-plate-2 side. On that account, the claw 11 does not mesh with the recessed portion 15. Accordingly, in a case of the lock mode in FIG. 2, at the time when the rotation direction of the rotating plate 3 is R2, torque transmission between the holding plate 2 and the rotating plate 3 is blocked and the rotating plate 3 is released.

In the meantime, in a case of the release mode in FIG. 3, the claws 11 are maintained to be accommodated on the holding-plate-2 side by the selector plate 4, so that the claws 11 do not reach the recessed portions 15 of the rotating plate 3. Accordingly, even if the rotation direction of the rotating plate 3 is either R1 or R2, torque transmission from the rotating plate 3 to the holding plate 2 is blocked, so that the rotating plate 3 is released.

Figure 4:
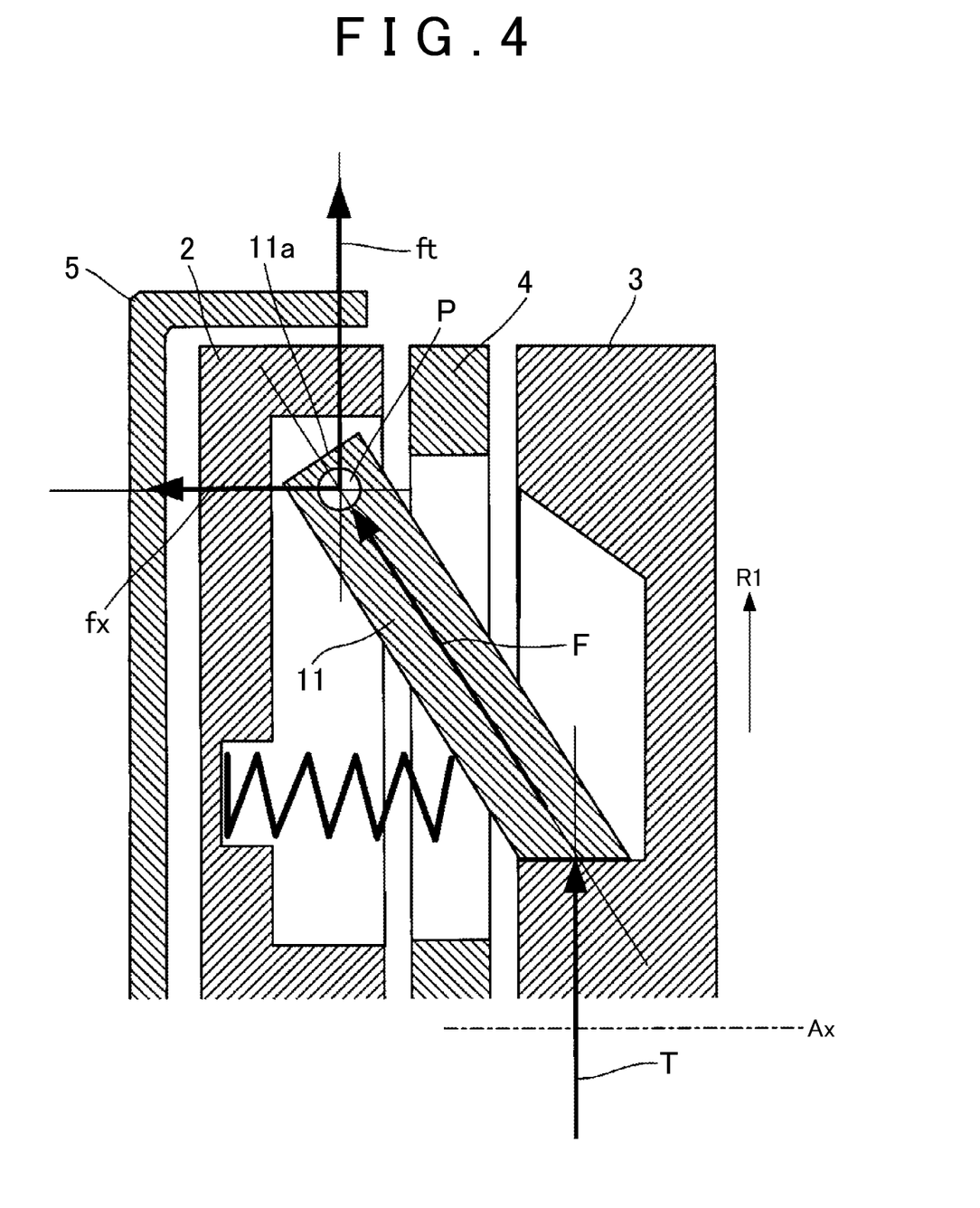
FIG. 4 is a view illustrating forces to occur at the time of joining of respective plates.

When the claw 11 meshes with the recessed portion 15 in the lock mode so that the holding plate 2 is joined to the rotating plate 3, a torque T is input into the claw 11 as illustrated in FIG. 4. A force F is input into the spindle P placed in the base end 11a of the claw 11 due to the input of the torque T. The force F has a component force fx in the axis-Ax direction and a component force ft in a tangent direction of the holding plate 2. As described above, the holding plate 2 is splined to the fixed shaft 101 so as to be allowed to move in the axis-Ax direction. Accordingly, when the force F is input into the spindle P of the claw 11, the holding plate 2 and the rotating plate 3 are distanced from each other with their axial centers being displaced from each other.

The clutch 1A is provided with the outer shell 5 for providing an alignment function to return the displaced axial center of the holding plate 2 to a normal place. As described above, the outer shell 5 is fixed to the fixed shaft 101, so as to cover the holding plate 2 except a facing side 2a that is opposed to the rotating plate 3. A predetermined clearance is secured between the outer shell 5 and the holding plate 2. An inner periphery 20 of the outer shell 5 is machined with accuracy, so that an inside diameter from the axis Ax to the inner periphery 20 is generally uniform around a whole circumference.

Figure 5:
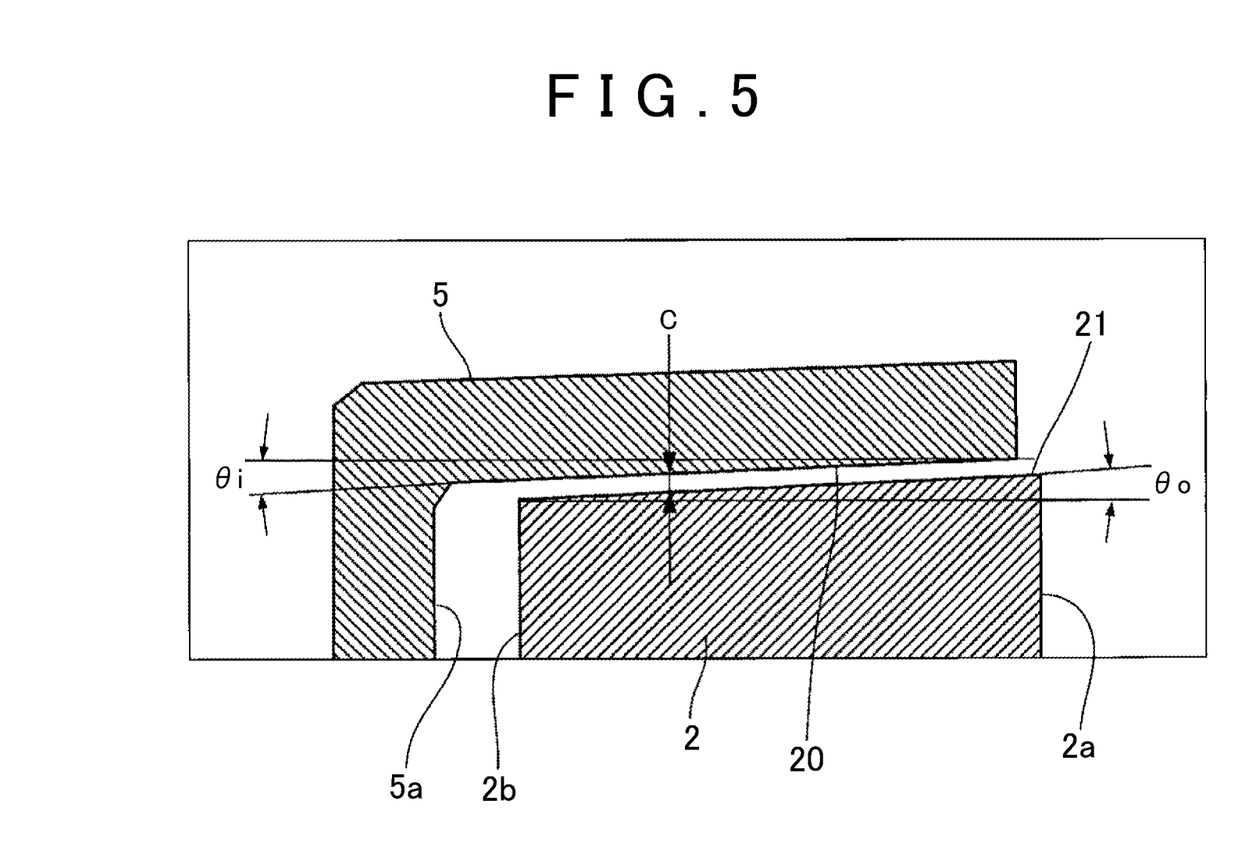
FIG. 5 is a partial magnified view of a part V in FIG. 2.

As illustrated in FIG. 5, the inner periphery 20 of the outer shell 5 and an outer periphery 21 of the holding plate 2 are formed in a tapered shape in which a diameter is gradually reduced toward a direction distanced from the rotating plate 3. The outer periphery 21 is covered with the inner periphery 20 of the outer shell 5. A taper angle θi of the inner periphery 20 and a taper angle θo of the outer periphery 21 are set to be equal to each other, but they may be different from each other. Further, the inner periphery 20, the outer periphery 21, and a clearance C therebetween are set, so that, at the time when the holding plate 2 is moved in the axis-Ax direction, an opposite side 2b to the facing side 2a of the holding plate 2 does not make contact with an inner surface 5a of the outer shell 5. The inner surface 5a is opposed to the holding plate 2.

Hereby, when the inner periphery 20 of the outer shell 5 makes contact with the outer periphery 21 of the holding plate 2 in a course where the holding plate 2 moves in a direction distanced from the rotating plate 3, the alignment function to reduce the displacement of the axial enter of the holding plate 2 by the outer shell 5 works. Accordingly, since such an alignment function works in the clutch 1A at the time when the holding plate 2 is joined to the rotating plate 3, a tolerance at the time of manufacturing design of each part such as the holding plate 2 can be increased so as to enlarge an allowable range of the displacement of the axial center. Hereby, when the holding plate 2 is joined to the rotating plate 3, a conversion amount at the time when part of an impact energy caused due to meshing of the claw 11 with the recessed portion 15 of the rotating plate 3 is converted into a kinetic energy can be increased. This can contribute to relaxing of an impact force at the time of the meshing of the claw 11.

Second Embodiment

Next will be described a second embodiment of the present invention with reference to FIGS. 6 and 7. In the following description, the same constituent as in the first embodiment has the same reference sign as in the first embodiment in the figures, and a description thereof is omitted.

Figure 6:
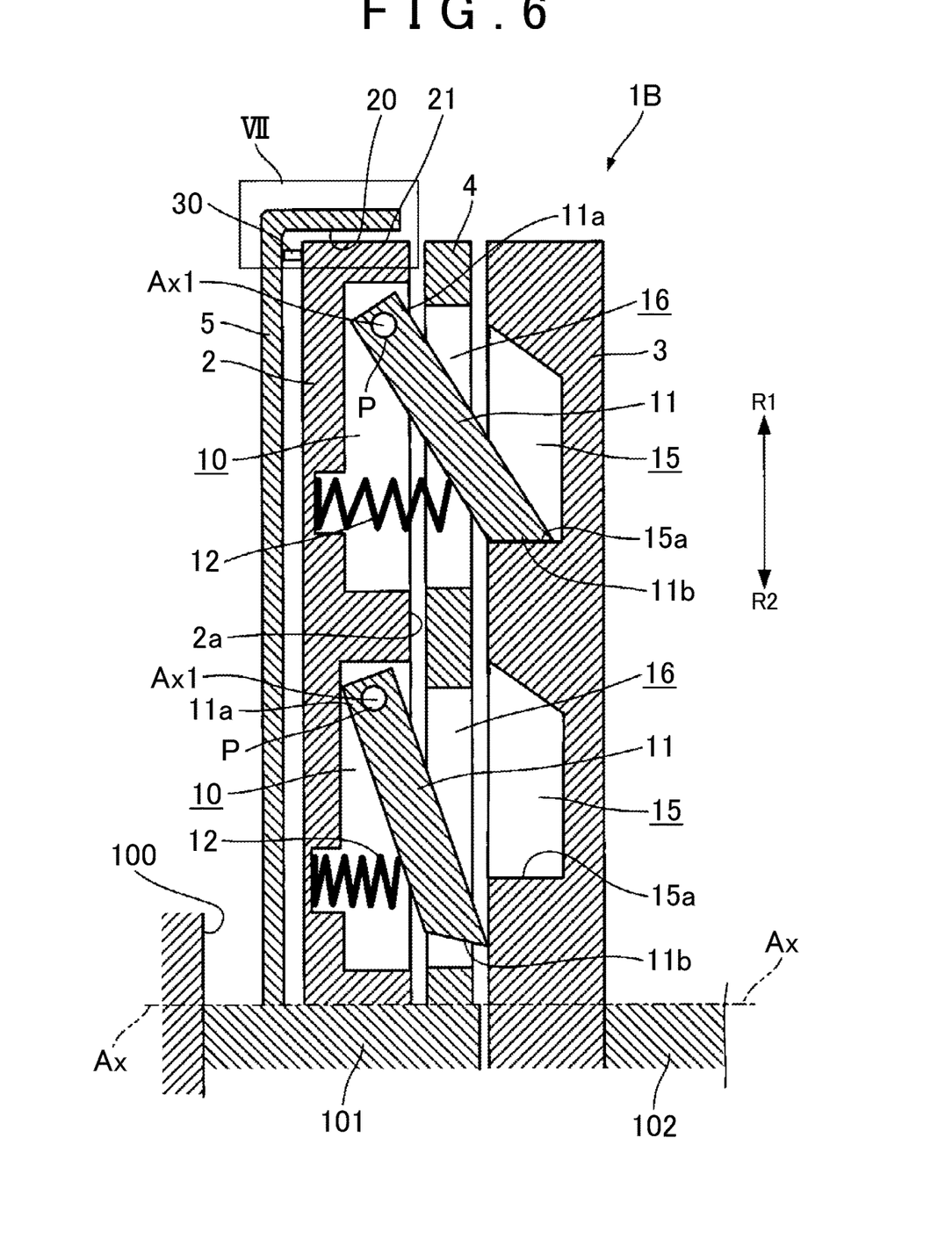
FIG. 6 is a sectional view illustrating a selectable one-way clutch according to a second embodiment.
Figure 7:
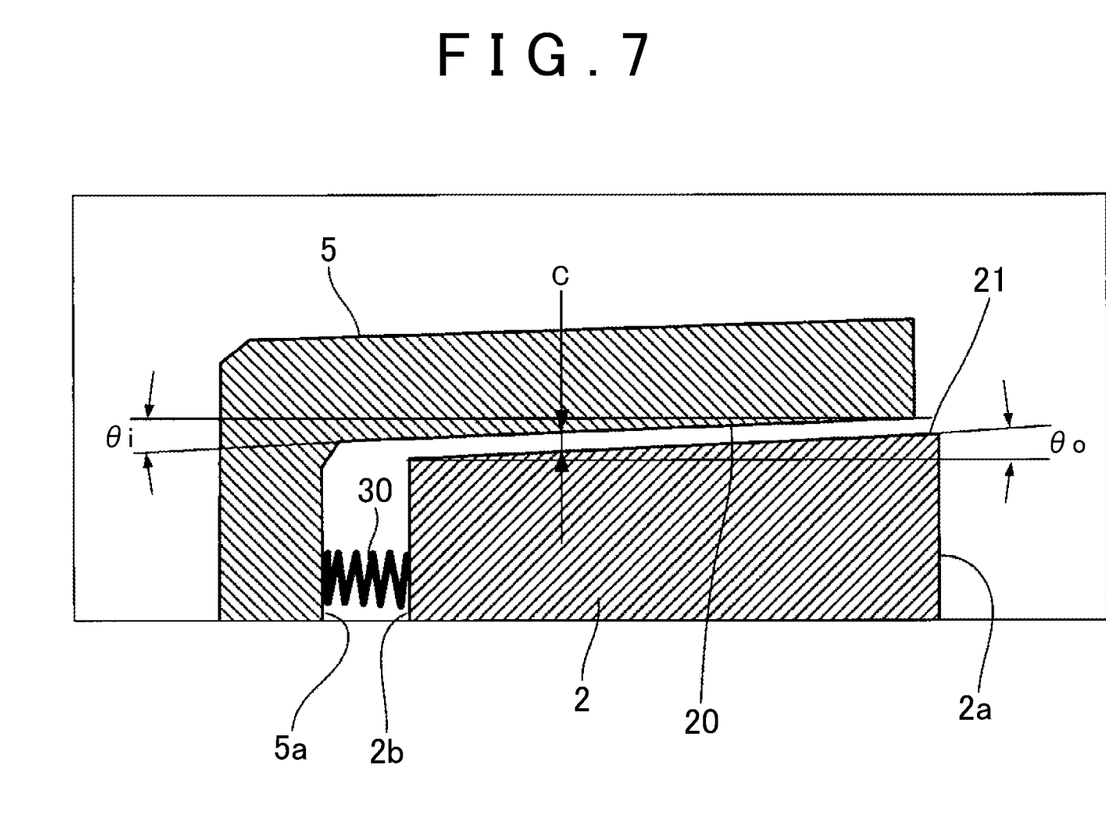
FIG. 7 is a partial magnified view of a part VII in FIG. 6.

As illustrated in FIGS. 6 and 7, a clutch 1B includes a return spring 30 as a biasing member provided between an inner surface 5a of an outer shell 5 and an opposite side 2b of a holding plate 2. The return spring 30 biases the holding plate 2 and the outer shell 5 in directions where they are distanced from each other. Note that, in FIGS. 6 and 7, only one return spring 30 is illustrated. However, in consideration of a balance in a circumferential direction, a plurality of return springs 30 (e.g., six return springs 30) is provided at regular intervals in the circumferential direction of the holding plate 2.

According to the clutch 1B, at the time when the holding plate 2 is released from the rotating plate 3, the holding plate 2 can be easily returned to an initial position (illustrated herein) distanced from the outer shell 5 by the return spring 30. Further, when the holding plate 2 moves in a direction distanced from the rotating plate 3 and makes contact with the outer shell 5 at the time when the holding plate 2 is joined to the rotating plate 3, an impact caused due to the contact can be relaxed by the return spring 30.

The embodiments have been described with the use of the drawings, but the present invention is not limited to them, but can be performed with various embodiments within the gist of the present invention. The structures and shapes of the clutches 1A, 1B illustrated in respective embodiments are just examples, and as far as the clutches 1A, 1B have the same function and operation, the present invention can be performed in an embodiment different from the structures and shapes illustrated herein.

In each of the embodiments, the outer shell 5 is fixed, the holding plate 2, which is the first plate, is non-rotatable but movable in the axis-Ax direction, and the rotating plate 3, which is the second plate, is rotatable around the axis Ax. However, each of the embodiments is just one application example of the clutch. For example, the present invention can be carried out in an embodiment in which an outer shell is fixed, and a first plate and a second plate are rotatable relative to each other around the same axis. The present invention can be also carried out in an embodiment in which an outer shell and a first plate are integrally rotatable around the same axis and a second plate is rotatable relative to the first plate around the same axis. In the latter one of these embodiments, there is no difference in rotational speed between the outer shell and the first plate. Accordingly, at the time of non-engagement in which the first plate is not joined to the second plate, it is advantageously possible to avoid the outer shell and the first plate from making contact with each other to cause friction.

In each of the embodiments, the outer shell 5 covers the holding plate 2 except the facing side 2a that is opposed to the rotating plate 3, but this is just an example. As far as the outer shell is positioned in the radial direction on the basis of the axis, the outer shell may just cover the outer periphery of the first plate. For example, the present invention can be carried out in an embodiment in which the outer periphery of the first plate is covered with a ring-shaped or tubular outer shell. Further, in each of the above embodiments, the outer shell 5 is fixed to the fixed shaft 101, but an object to which the outer shell 5 is fixed may be the case 100 that stands still relative to the fixed shaft 101, for example. In short, the outer shell may be in an immovable state relative to the holding member on which the first plate is mounted.

What is claimed is:

1. A selectable one-way clutch comprising: a first plate; a second plate placed on a same axis as the first plate, the second plate having a recessed portion; a claw provided in the first plate, the claw being configured to project from the first plate toward the second plate, the claw being configured to mesh with the recessed portion of the second plate in a state where the claw projects from the first plate only at a time when the second plate rotates in a predetermined rotation direction; a selector plate placed between the first plate and the second plate, the selector plate being configured to change a state of the claw between a state where the claw is projectable from the first plate and a state where the claw is maintained to be accommodated on a first-plate side; and an outer shell configured to cover an outer periphery of the first plate, the first plate being mounted on a holding member such that the first plate is non-rotatable around the axis and moves in a direction of the axis, the outer shell being configured to be immovable relative to the holding member and displaced from the axis in a radial direction, the outer periphery of the first plate covered with the outer shell and an inner periphery of the outer shell that covers the outer periphery of the first plate having a tapered shape in which a diameter of each of the outer periphery of the first plate and the inner periphery of the outer shell are gradually reduced toward a direction distanced from the second plate, and a biasing member provided between the first plate and the outer shell, the biasing member being configured to bias the first plate and the outer shell in directions where the first plate and the outer shell are distanced from each other.

* * * * *